(12) United States Patent
Hwang et al.

(10) Patent No.: US 9,140,845 B2
(45) Date of Patent: Sep. 22, 2015

(54) DISPLAY DEVICE HAVING IMPROVED ILLUMINATION CHARACTERISTICS

(71) Applicant: SAMSUNG DISPLAY CO., LTD., Yongin-City, Gyeonggi-Do (KR)

(72) Inventors: Seong-Yong Hwang, Asan-si (KR); Do Hun Kim, Changwon-si (KR); Sang Hoon Lee, Hwaseong-si (KR); Won Jin Kim, Chungcheongnam-do (KR); Hyun-Hwa Song, Suwon-si (KR); Sang Heon Ye, Cheonan-si (KR); Ji Won Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/320,022

(22) Filed: Jun. 30, 2014

(65) Prior Publication Data
US 2015/0009712 A1 Jan. 8, 2015

(30) Foreign Application Priority Data

Jul. 2, 2013 (KR) .................. 10-2013-0077232
Feb. 11, 2014 (KR) .................. 10-2014-0015556

(51) Int. Cl.
*F21V 7/04* (2006.01)
*F21V 8/00* (2006.01)
(52) U.S. Cl.
CPC .................................... *G02B 6/0051* (2013.01)
(58) Field of Classification Search
CPC ................................................. G02B 6/0051
See application file for complete search history.

(56) References Cited

U.S. PATENT DOCUMENTS

| 8,373,823 | B2 | 2/2013 | Heo |
| 2003/0137824 | A1* | 7/2003 | Shinohara et al. ............... 362/31 |
| 2004/0066476 | A1* | 4/2004 | Lee et al. ...................... 349/112 |
| 2005/0002204 | A1* | 1/2005 | Lin et al. ....................... 362/551 |
| 2009/0185385 | A1* | 7/2009 | Shiau et al. .................... 362/339 |
| 2010/0103350 | A1* | 4/2010 | Arai et al. ....................... 349/64 |
| 2010/0149453 | A1 | 6/2010 | Lee et al. |
| 2012/0050635 | A1 | 3/2012 | Yoo et al. |
| 2012/0081882 | A1 | 4/2012 | Im et al. |
| 2012/0081918 | A1 | 4/2012 | Yang et al. |
| 2012/0230008 | A1 | 9/2012 | Ajichi et al. |
| 2014/0111741 | A1* | 4/2014 | Han et al. ........................ 349/62 |

FOREIGN PATENT DOCUMENTS

| JP | 2011-171208 A | 9/2011 |
| JP | 2011-216322 A | 10/2011 |
| KR | 10-2009-0128693 A | 12/2009 |
| KR | 10-2010-0078296 A | 7/2010 |

(Continued)

*Primary Examiner* — Donald Raleigh
(74) *Attorney, Agent, or Firm* — Innovation Counsel LLP

(57) ABSTRACT

A display device includes a display panel including a display area in which an image is displayed, and a light unit that includes: a light guide plate including a light receiving surface and a light emitting surface; a light source spaced apart from the light receiving surface while facing the light receiving surface and overlapping the display area; and a light diffusion member extending between the light receiving surface and the light source. The light diffusion member includes at least one of a first pattern formed on a surface of the light diffusion member facing the light emitting surface, and a second pattern formed on another surface of the light diffusion member, thereby implementing uniform brightness across the whole surface of the display panel.

19 Claims, 14 Drawing Sheets

(56) References Cited

FOREIGN PATENT DOCUMENTS

| KR | 10-2011-0040365 A | 4/2011 |
| KR | 10-2011-0132152 A | 12/2011 |
| KR | 10-2013-0003937 A | 1/2013 |
| KR | 10-2013-0011855 A | 1/2013 |

* cited by examiner

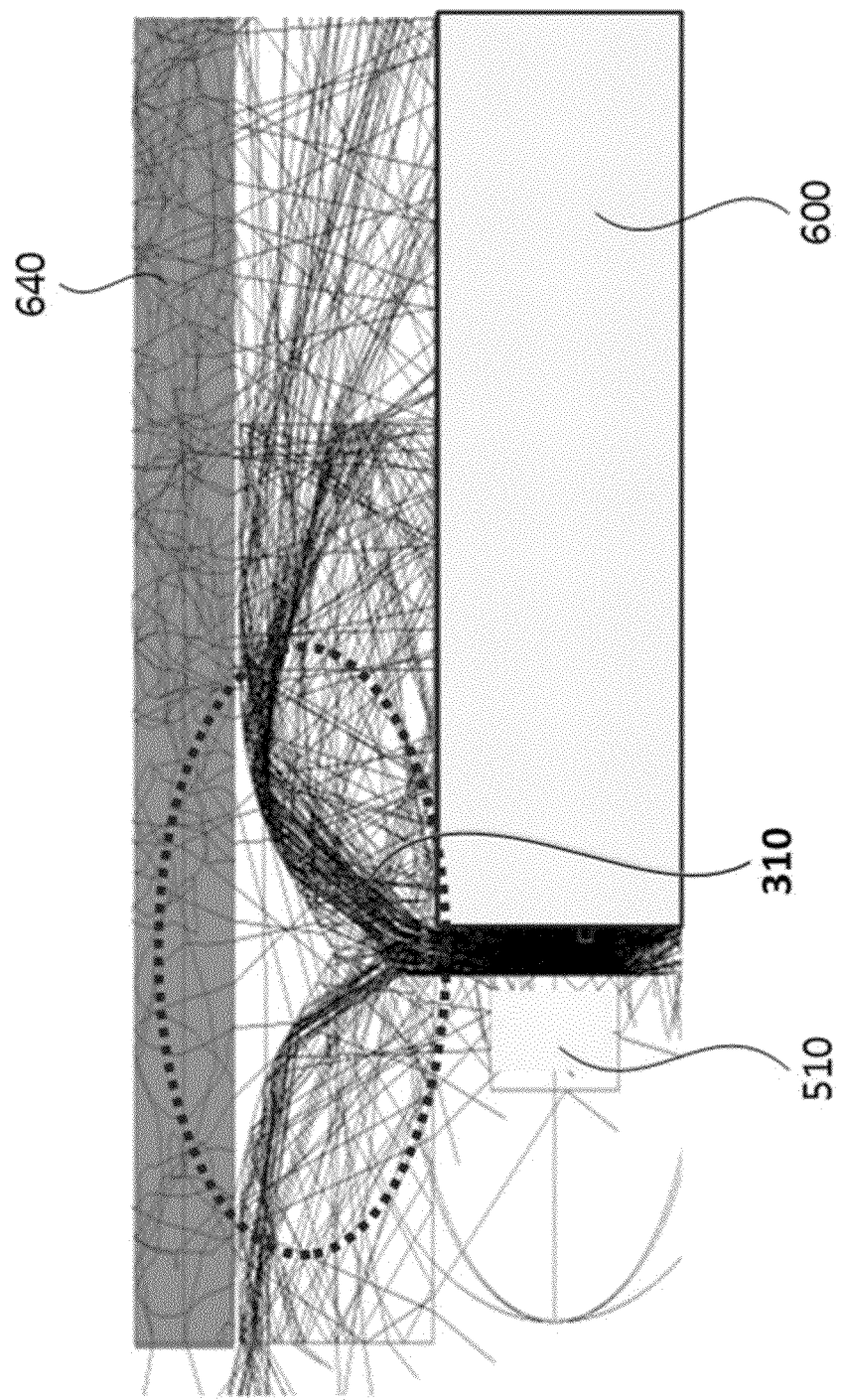

DISPLAY DEVICE HAVING IMPROVED ILLUMINATION CHARACTERISTICS

CROSS-REFERENCE TO RELATED APPLICATIONS

This application claims priority to, and the benefit of, Korean Patent Application Nos. 10-2013-0077232 and 10-2014-0015556 filed in the Korean Intellectual Property Office on Jul. 2, 2013 and Feb. 11, 2014 respectively, the entire contents of which are incorporated herein by reference.

BACKGROUND (a) Field

Embodiments of the present invention relate generally to display devices. More specifically, embodiments of the present invention relate to display devices with improved illumination characteristics.

(b) Description of the Related Art

Many contemporary computer monitors, televisions, mobile phones, and the like, each of which are in wide use today, often require display devices. An example of such a display device may include a cathode ray tube display, a liquid crystal display, a plasma display, and the like.

The liquid crystal display (LCD), which has recently received attention, has advantages such as the fact that the technology lends itself well to miniaturization, weight reduction, and low power consumption, and therefore has been gradually gaining interest as an alternative device capable of overcoming drawbacks of the existing cathode ray tube (CRT). Accordingly, it is currently mounted in almost all information processing devices which require a display device.

In general, the LCD display device is a device which generates an electric field by applying different potentials to a pixel electrode and a common electrode in a state in which a liquid crystal material is injected between an upper substrate on which the common electrode, a color filter, and the like are formed and a lower substrate on which a thin film transistor, the pixel electrode, and the like are formed, so as to change an arrangement of liquid crystal molecules and control transmittance of light, thereby displaying images.

A display panel of the LCD display device is a non-emissive light receiving device, and therefore a back surface of the display panel is provided with a light unit for supplying light to the display panel.

Meanwhile, demand for a thin display device has recently increased. The display device may be implemented as a structure in which a bezel portion, which is configured from a top chassis and a bottom chassis which are positioned at edges of the display panel, may be formed to be narrow or designed to have a structure in which a portion of the chassis may be removed so as to minimize or remove the bezel portion. However, as the bezel portion is reduced, a light source is exposed to more of a display region, and thus a light leakage phenomenon may occur in the display panel.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device capable of reducing a light leakage phenomenon due to a light source in a display device when a light source is positioned in a display area, and providing more uniform brightness across the entire surface of a display panel.

An exemplary embodiment of the present invention provides a display device including a display panel with a display area configured to display an image, and a light unit configured to provide light to the display panel. The light unit includes: a light guide plate including a light receiving surface and a light emitting surface; a light source spaced apart from the light receiving surface while facing the light receiving surface and overlapping the display area; and a light diffusion member extending between the light receiving surface and the light source. The light diffusion member includes at least one of a first pattern formed on a first surface of the light diffusion member facing the light emitting surface of the light guide plate, and a second pattern formed on a second surface of the light diffusion member.

The first pattern and the second pattern may include at least one groove.

Either one of the first pattern and the second pattern may include a first groove having a surface inclined with respect to the light emitting surface of the light guide plate so as to extend in one direction.

The remaining one of the first pattern and the second pattern may further include a second groove having a surface inclined with respect to the light emitting surface of the light guide plate so as to extend in another direction different from the one direction.

The first pattern and the second pattern may be asymmetric with respect to an axis positioned between the first and second patterns.

The first pattern and the second pattern may be symmetric with respect to an axis positioned between the first and second patterns.

A first end of the first pattern may overlap the light emitting surface of the light guide plate and a second end of the first pattern may overlap the light source.

The at least one groove may have a curved surface.

A first end of the light diffusion member overlapping the light guide plate may have a curved surface.

An end of the light diffusion member overlapping the light guide plate may have a tapered end.

A second end of the light diffusion member may overlap the display area.

A sum of an angle between the light emitting surface of the light guide plate and a surface of the first pattern and an angle between the light emitting surface of the light guide plate and the second pattern is between about 50° and about 100°.

The light diffusion member may be configured and oriented so that at least some light enters the light diffusion member from the light source at a first angle between rays of the at least some light and the light emitting surface, and the at least some light subsequently exits the light diffusion member at a second angle between rays of the at least some light and the light emitting surface, the first angle being greater than the second angle.

The light unit may further include a diffuser positioned on the light diffusion member, and the diffuser may overlap the light diffusion member and the light guide plate.

Surfaces of the at least one of the first and second patterns may be oriented so that light entering the light diffusion member from the light source is reflected by the surfaces back into the light diffusion member so as to repeatedly propagate through the light diffusion member.

The surfaces of the at least one of the first and second patterns are oriented so that light propagating through the light diffusion member may be emitted in substantially uniform manner across an outer surface of the light diffusion member.

The display device may further include a reflective sheet positioned on one surface of the light diffusion member.

The display device may further include a chassis in which the light unit is mounted, wherein the light diffusion member further includes a fixing part which extends into a space between the light diffusion member and the chassis.

The fixing part may be formed by double insert injection.

As set forth above, according to the display device, it is possible to implement the display device including a thin bezel while having reduced light leakage and providing substantially uniform brightness across the entire surface of the display panel, even when the light source is positioned in the display area.

BRIEF DESCRIPTION OF THE DRAWINGS

FIG. 4B is an image illustrating a simulated light diffusion path according to the exemplary embodiment of FIG. 4A.

DETAILED DESCRIPTION OF THE EMBODIMENTS

Figure 1:
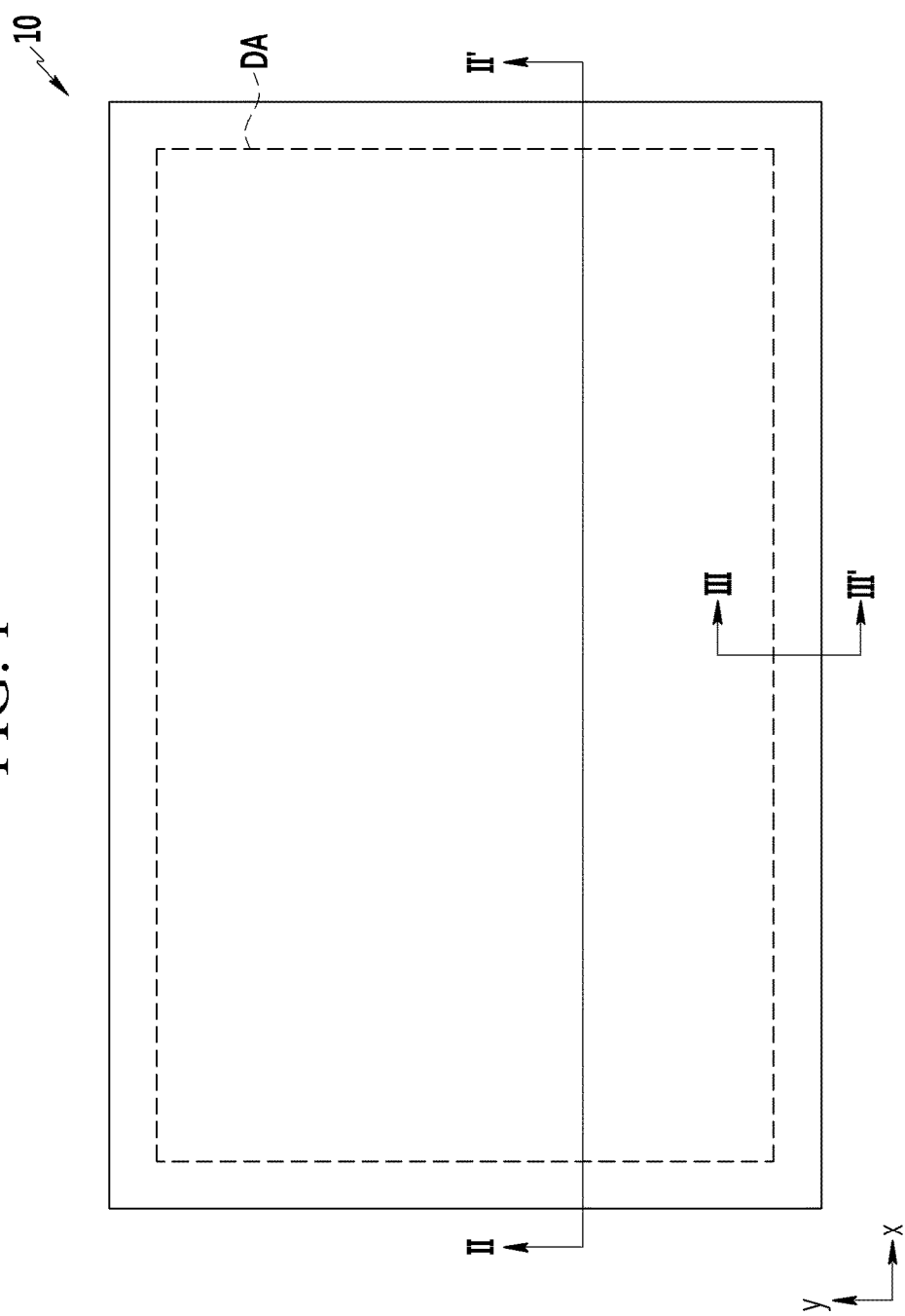
FIG. 1 is a plan view of a display device according to an exemplary embodiment of the present invention.

The present invention will be described more fully hereinafter with reference to the accompanying drawings, in which exemplary embodiments of the invention are shown As those skilled in the art would realize, the described embodiments may be modified in various different ways, all without departing from the spirit or scope of the present invention.

In the drawings, the thickness of layers, films, panels, regions, etc., are exaggerated for clarity. The drawings are thus not to scale. Like reference numerals designate like elements throughout the specification. It will be understood that when an element such as a layer, film, region, or substrate is referred to as being "on" another element, it can be directly on the other element or intervening elements may be also present. In contrast, when an element is referred to as being "directly on" another element, there are no intervening elements present.

Figure 3:
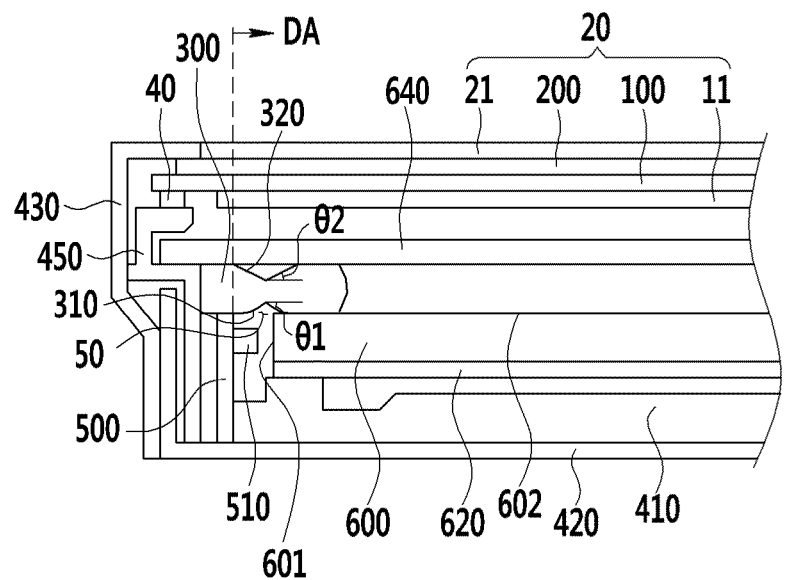
FIG. 3 is a cross-sectional view taken along line III-III' of FIG. 1.
Figure 4A:
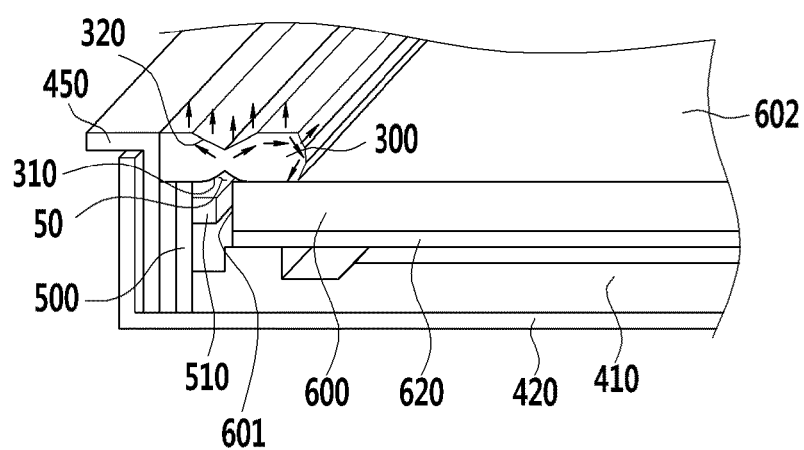
FIG. 4A is a partial perspective view of FIG. 3.

First, a display device according to an exemplary embodiment of the present invention will be described in detail with reference to FIGS. 1 to 4. FIG. 1 is a plan view of a display device according to an exemplary embodiment of the present invention, FIG. 2 is a cross-sectional view taken along the line II-II' of FIG. 1, FIG. 3 is a cross-sectional view taken along the line III-III' of FIG. 1, FIG. 4A is a partial perspective view of FIG. 3, and FIG. 4B is an image illustrating a simulated light diffusion path according to the exemplary embodiment of FIG. 4A.

A display device 10 illustrated in FIG. 1 includes a display panel 20 including a first substrate 100 and a second substrate 200 which are coupled to each other and face each other. The display panel 20 includes a display region DA which is provided with a plurality of pixels to display an image.

Figure 2:
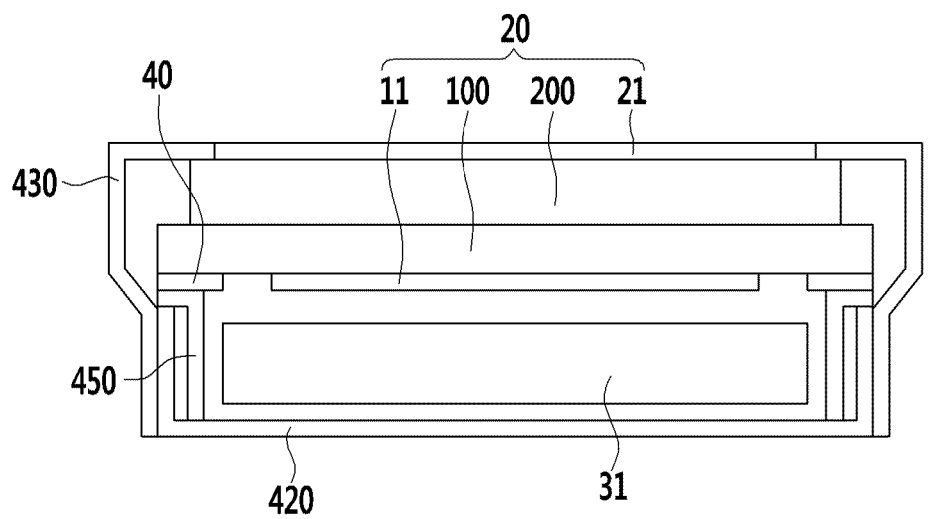
FIG. 2 is a cross-sectional view taken along line II-II' of FIG. 1.

The display device 10 according to the exemplary embodiment illustrated in FIG. 2 is largely configured of a light unit 31 which supplies light and the display panel 20 which receives light to display an image.

The display panel 20 serves to display an image, and includes the first and second substrates 100 and 200 bonded to each other, facing each other, and having a liquid crystal layer disposed therebetween. In this case, although not clearly illustrated in the drawings, under the premise of the active matrix type display, the first substrate 100, called a lower substrate or an array substrate, is equipped with pixels in which a plurality of gate lines intersect a plurality of data lines, and each intersecting point is provided with thin film transistors (TFTs) which are connected one-to-one to transparent pixel electrodes formed in each pixel. Further, the second substrate 200, called an upper substrate or a color filter substrate, is provided with color filters of, for example, red (R), green (G), and blue (B) colors, which correspond to each pixel, and a black matrix surrounding each of the color filters and covering non-display elements, such as a gate line, a data line, and a thin film transistor. Any color filters having any colors are contemplated.

Further, the first substrate 100 or the second substrate 200 may be provided with a transparent common electrode which corresponds to the pixel electrode. Outer surfaces of the first and second substrates 100 and 200 have affixed thereto first and second polarizers 11 and 21, which selectively transmit only specific light, respectively.

Therefore, in the display panel 20 having the above-mentioned structure, when the thin film transistors selected for each gate line are turned on by a turn-on signal of a gate driving circuit transferred through a printed circuit board, a signal voltage of the data driving circuit is transferred to a corresponding pixel electrode through a data line, such that an arrangement direction of liquid crystal molecules is changed by an electric field between the pixel electrode and the common electrode, thereby showing a difference in transmittance. The light unit 31 will be described below in more detail.

The display device according to the exemplary embodiment of the present invention fixes the light unit 31 within itself using an auxiliary chassis 410 and a bottom chassis 420. Next, the display panel 20, which is connected to a mold frame 450 by an adhesive part 40, is coupled to a top chassis 430, thereby creating a coupling between the display panel 20 and the light unit 31. That is, the bottom chassis 420 fixes and receives the light unit 31 and the top chassis 430 is connected to the bottom chassis 420 to fix the entire display device 10.

As illustrated in FIG. 3, the auxiliary chassis 410 may have a shape which is enclosed by the bottom chassis 420. The auxiliary chassis 410 may include a bottom surface and sides connected to the bottom surface, and the sides of the auxiliary chassis 410 may have attached thereto a circuit board 500 of the light unit 31. The circuit board 500 may be fixed to the auxiliary chassis 410 by an adhesive member, a screw member, or the like.

A shape of the bottom chassis 420 is not limited to that shown in the Figures, but the bottom chassis 420 is shown as having a rectangular parallelepiped box shape of which the upper portion is open, thereby forming a receiving space having a predetermined depth therein. That is, the bottom chassis 420 includes a bottom surface and side walls extending upward from four edges of the bottom surface. The receiving space receives the light unit 31 for supplying light to the display panel 20.

Further, the top chassis 430 couples the display panel 20 to the light unit 31 after the display panel 20 is seated on the light unit 31. Tempered glass may be attached on an upper surface of the top chassis 430 by an adhesive, in order to protect the display panel 20.

The top chassis 430 has an upper surface surrounding the edge of the display panel 20. However, according to the exemplary embodiment of the present invention, a width of a bezel may be very small or omitted due to the top chassis 430. Therefore, the thickness and weight of the display device may be reduced, but the light source included in the light unit 31 is exposed to the display area DA, which may cause light leakage.

Further, as illustrated in FIGS. 2 and 3, the display device 10 may include the mold frame 450, and the mold frame 450 helps couple the light unit 31 and the display panel 20 together.

In the display device 10 according to another exemplary embodiment of the present invention, the top chassis 430 is omitted and thus the mold frame 450 forms an outermost structure.

Hereinafter, the light unit 31 for a display device according to the exemplary embodiment of the present invention will be described in more detail with reference to FIG. 3. The light unit 31 includes a light guide plate 600, a light source 510, and a light diffusion member 300.

The light guide plate 600 includes a light receiving surface 601 facing the light source 510 and to which light emitted from the light source 510 is incident, as well as a light emitting surface 602 which more uniformly emits light coming in through the light receiving surface 601. The light guide plate 600 is used to uniformly transfer the light emitted from the light source 510 to the display panel 20. That is, when the display device is implemented by forming the display panel 20 on the light unit 31, the light guide plate 600 uniformly distributes the light incident to the light receiving surface 601 to the light emitting surface 602, thereby projecting more uniform light upon the display panel 20.

The light guide plate 600 may be made of a material including an acrylic injection material, and may be generally made of polymethylmethacrylate (PMMA) having high light transmittance. However, embodiments of the invention are not limited thereto, and any suitable transparent material is contemplated.

As another example, the light guide plate 600 may be made of poly methacrylstyrene (MS) having excellent heat resistance and humidity resistance as compared to PMMA.

The light guide plate 600 may be shaped as a wedge-type plate or a flat-type plate, and one surface or both surfaces thereof may have patterns, but the exemplary embodiment of the present invention is not limited thereto. The circuit board 500 has the light source 510 mounted thereon and may be formed as a printed circuit board (PCB). The printed circuit board (PCB) is configured by removing an unnecessary copper foil from a board formed by covering an insulating plate with the thin copper foil, thus forming conductive traces according to a circuit diagram, and forming electronic circuits on the board. The light sources 510 mounted on the circuit board 500 are connected by wiring (not illustrated). While referred to often herein as a singular light source 510, the light source 510 may comprise multiple individual light sources. A plurality of such light sources 510 may be integrally connected to each other by the wiring, and may be connected by being divided into a plurality of groups. For example, three light sources 510 may be connected by the wiring so that the same signal may be applied to each of the three light sources 510. Each light source 510 may be applied with a signal, which may drive the light source 510, through the wiring. As illustrated in FIG. 3, the light source 510 is positioned on one side of the light guide plate 600 and is formed to be spaced apart from the light guide plate 600.

The light source 510 is formed and positioned to direct light primarily to one side of the light guide plate 600, such that the light emitted from the light source 510 may be incident to one side of the light guide plate 600. That is, as illustrated in FIG. 3, the light source 510 is disposed to face one side of the light guide plate 600. Thus, the light source 510 may be an edge type in which the light source 510 is positioned on a side of the light guide plate 600. The present specification illustrates that the light source 510 is formed to face one light receiving surface 601, but is not limited to thereto, and the light guide plate 600 may have two or more light receiving surfaces 601 which are positioned at respective sides thereof and the light source 510 may also be formed to face each of the two or more light receiving surfaces 601. For example, the light guide plate 600 may have four light receiving surfaces, and the light source 510 may be formed on all of the areas which face the four light receiving surfaces.

The light source 510 is positioned inside the display area DA and overlaps the display panel 20. Therefore, a space 50 between the light source 510 and the light receiving surface 601 of the light guide plate 600 is formed within and covering the display area DA. The reason is that a width of the upper surface of the top chassis 430, that is, the width of the bezel, is thin, and when the light diffusion member 300 positioned in the space 50 is omitted, light leakage may occur.

Further, even if the light source 510 is positioned outside a boundary of the display area DA and the light guide plate 600 is positioned inside the boundary of the display area DA, the space between the light source 510 and the light receiving surface 601 of the light guide plate may be positioned inside the display area DA. Even in this case, when the light diffusion member 300 positioned in the space 50 is omitted, the light source may be visually seen as light leakage.

The position of the light source 510 is described above, but embodiments of the present invention are not limited thereto, and therefore the light source 510 may be positioned at any location which may result in light leakage.

Further, the light source 510 may be, for example, a light emitting diode (LED). Although the case in which the light source 510 is the light emitting diode (LED) is described above by way of example, embodiments of the present invention are not limited thereto, and a cold cathode fluorescent lamp (CCFL) and the like, or any other suitable light source, may be used as the light source 510. The above-mentioned light emitting diode (LED) is configured of a group of red (R), green (G), and blue (B) LEDs to implement white light, although any other color combinations are also contemplated.

A plurality of light sources 510 may be provided, and may be disposed at predetermined intervals. However, the present invention is not limited thereto, and the plurality of light sources 510 may also be disposed at irregular intervals.

Next, the light diffusion member 300 according to the exemplary embodiment of the present invention will be described. As described above, the light diffusion member 300 is used to prevent light leakage or a hot-spot which occurs when the width of the top chassis 430 positioned on the display panel is thin or omitted.

As illustrated in FIG. 3, as the width of the upper surface of the top chassis 430 is reduced, the light source 510 becomes positioned in the display area DA, and the space 50 between the light source 510 and the light guide plate 600 comes to be formed in the display area. For the portion of the display panel which is positioned in the area corresponding to the light guide plate 600, uniform light is emitted due to the light guide plate 600. However, areas outside this portion, e.g. the area in which only the light source 510 is positioned or the space 50 between the light source 510 and the light guide plate 600, may be visually seen as excessively bright or excessively dark.

Further, the light diffusion member 300 diffuses leaked light so as to more uniformly emit light through the display panel as well as to simply block unwanted light. Therefore, the light diffusion member 300 may be positioned to intercept light which would otherwise leak from the space 50 between the light source 510 and the light guide plate 600, and particularly, may be formed at a position blocking one surface of the space between the light source 510 and the light guide plate 600. That is, the light diffusion member 300 blocks one surface of the space 50 between the light guide plate 600 and the light source 510. In other words, the light diffusion member 300 extends between and overlaps both the light guide plate 600 and light source 510.

A material of the light diffusion member 300 can include any one of transparent silicon, polycarbonate, and acrylic resin (polymethyl methacrylate (PMMA)). That is, the light diffusion member 300 may be made of a flexible material, and as an example thereof, a silicon material and the like are described, but the light diffusion member 300 is not limited thereto and may be made of any material which may distribute light.

Further, the light diffusion member 300 may further include a diffusing agent to diffuse light moving therein, thereby enabling diffusion and reflection depending on the shape thereof and diffusion of leaked light depending on the material thereof.

As illustrated in FIGS. 3 and 4A, the light diffusion member 300 includes a first pattern 310 and a second pattern 320 which block the leaked light and again uniformly diffuse the leaked light. The first pattern 310 is positioned on a surface of the light diffusion member 300 which faces the light emitting surface 602 of the light guide plate, and the light provided from the light source 510 is incident onto the light diffusion member 300 through the first pattern 310. The second pattern 320 is positioned on the other surface of the light diffusion member 300 so as to be opposed to the first pattern 310.

Any one or both of the first pattern 310 and the second pattern 320 may include at least one groove. Referring to FIGS. 3 and 4A, both of the first pattern 310 and the second pattern 320 include the groove, and as an example, the first pattern 310 may have a curved groove shape. That is, a shape of the groove is not limited, and any shape is contemplated.

The light leaked from the light source 510 toward the diffusion member 300 may enter the diffusion member 300 through the first pattern 310, where it is reflected by the groove in the second pattern 320 so as to be circulated inside the light diffusion member 300.

In detail, the grooves included in the first pattern 310 and the second pattern 320 are formed as depressions in the diffusion member 300, as illustrated in FIG. 3. In particular, the second pattern 320 forms a predetermined angle, and therefore the light incident to the light diffusion member 300 is totally reflected back within the body of diffusion member 300. Therefore, it is possible to prevent the light incident through the patterns from being emitted again. Light entering the member 300 is thus diffused inside the light diffusion member 300.

As seen in FIG. 3, acute angle $\theta 1$ is formed between the light emitting surface 602 and the surface of the groove in first pattern 310, and acute angle $\theta 2$ is formed between the light emitting surface 602 and the surface of the groove in second pattern 320. A sum of angle $\theta 1$ and angle $\theta 2$ ranges from 50° to 100°, preferably about 70°. The light incident into the light diffusion member 300 is made to be entirely reflected back into member 300 by controlling the angles $\theta 1$ and $\theta 2$. Meanwhile, the totally reflected light may be emitted from the light diffusion member 300 while having a smaller value than the angle of the light leaked from the light source 510, as the diffusion member 300 acts to diffuse and otherwise reduce the magnitude of light therein.

Further, one end of either one of the first pattern 310 and the second pattern 320 may overlap the light emitting surface 602 of the light guide plate 600 and the other end thereof may overlap the light source 510, but the exemplary embodiment of the present invention is not limited thereto. For example, the diffusion member 300 may only partially overlap the light source 510, or conversely may completely overlap and extend beyond the light source 510.

In summary, the one end of the light diffusion member 300 is positioned on the light guide plate 600 and may overlap the light emitting surface 602 of the light guide plate 600, and the other end of the light diffusion member 300 may be positioned outside the display area while overlapping the light source 510 and the circuit board 500 having the light source 510 mounted thereon, and thus may be positioned over the boundary of the display area. A part of the light may be emitted through the other end of the light diffusion member 300 which is positioned outside the display area, and a part of the light may be emitted through the end of the light diffusion member 300 inside the display area, such that uniform light may be emitted regardless of the boundary or size of the display area.

Meanwhile, one end of the light diffusion member 300 has a tip formed with a tapered shape and a curved shape, as illustrated in FIGS. 3 and 4A. Describing a cross-section of the light diffusion member 300 with reference to FIG. 3, the tip at the right upper end in the light diffusion member 300 has a tapered shape and the tip at the right lower end has a curved shape. The shape forms a boundary between the light guide plate 600 and the end of the light diffusion member 300, to prevent a bright spot or dark spot from occurring at the boundary therebetween. This will be described below in more detail.

FIG. 4A illustrates the path of light within and exiting diffusion member 300 by arrows. A part of the light emitted from the light source 510 moves through the space 50 and is incident into the light diffusion member 300 through the first pattern 310 of the light diffusion member 300.

The light incident to the light diffusion member 300 is completely reflected by the second pattern 320, and is circulated inside the light diffusion member 300 along the sectional shape of the light diffusion member 300 toward one of the ends of the light diffusion member 300. The material of the light diffusion member 300 includes a material which may circulate light, making such movement possible.

Now, the path of light circulated toward the end of the light diffusion member 300 overlapping the light guide plate 600 will be described. A part of the incident light is reflected toward the area overlapping the light guide plate 600, and a part of the incident light is reflected toward a surface perpendicular to the display panel. Light is thus spread out within the diffusion member 300, so that the light diffusion member 300 emits more uniform light.

Next, some of the reflected light travels along the shape of the light diffusion member 300 and is partially emitted at the tapered shape area positioned at the right upper end of member 300. The amount of emitted light is substantially the same as the predetermined amount of light emitted at the left end of the tapered area.

Further, reflected light which travels along the curved shape area positioned at the right lower end is again partially emitted, and the emitted light collides with the light guide plate 600 and thus is again emitted to the surface perpendicular to the display panel. In this case, the amount of emitted light may also be substantially the same as the amount of light as described above.

As described above, the emitted light is a part of the light emitted within the display area, and may be visually seen in the display image by the user. As this emitted light is emitted substantially uniformly across the body of the diffusion member 300, dark spots and bright spots in the display area are substantially reduced or eliminated.

Meanwhile, the light reflected toward the other end of the light diffusion member 300 overlapping the light source 510 is also partially emitted while moving along the sectional shape of the light diffusion member 300. Further, part of the light may be emitted at other areas, for example an area near or contacting the mold frame 450. In this case, the area from which the light is emitted is positioned outside the display area and thereby is not visually seen by a user's eye.

A simulation of the above-mentioned paths of light is illustrated in FIG. 4B. The paths of light are displayed by black lines, and many overlap each other. Referring to FIG. 4B, the light moving through the space 50 is incident to the light diffusion member 300, and part of this light is emitted toward a diffuser 640 while being circulated within the light diffusion member 300 and a part of the light is again emitted through one end of member 300 overlapping the light guide plate 600. Therefore, describing the light incident to the diffuser 640, it may be appreciated that the light exiting the member 300 is incident to the light guide plate 600 and the diffuser 640 in roughly equal amounts. Furthermore, the exiting light is spread out across a wide area of both the plate 600 and diffuser 640.

FIG. 4B also shows that light incident to the member 300 is redirected by the surfaces of the grooves. In particular, light enters at a steep angle (relative to the upper surface of light guide plate 602), and is redirected by the groove surfaces back into the member 300 at much shallower angles, so that light is spread out and dispersed throughout the body of member 300. Light exiting the member 300 thus exits at shallower angles, meaning that it is dispersed far more, leading to more uniform illumination of the display panel and preventing light and dark spots from occurring.

Therefore, the display device according to the exemplary embodiment of the present invention may provide more uniform light without being visually seen as light leakage or dark spots, even when the light source is positioned within the display area.

The light unit 31 according to the exemplary embodiment of the present invention may further include a reflector 620 which is positioned beneath the light guide plate 600. The reflector 620 reflects light back toward the display panel so as to prevent the light emitted from the light source 510 from being leaked to the outside. That is, when the light emitted by the light source 510 is emitted toward the lower surface of the light guide plate 600, the reflector 620 reflects the light upward and back into the light guide plate 600 again.

As illustrated in FIGS. 3 and 4A, the reflector 620 may be a flat platelike structure, but its shape is not limited thereto, and may be manufactured in a shape having a reference reflective surface and an inclined surface having a predetermined angle of inclination from the reference reflective surface.

The reflector 620 may be attached to the auxiliary chassis 410 or the bottom chassis 420 by an adhesive means, such as an adhesive like a double-sided tape, and may alternately or additionally be fastened to the auxiliary chassis 410 or the bottom chassis 420 by a fastening means, such as a screw.

The light unit 31 according to the exemplary embodiment of the present invention may further include the diffuser 640. The diffuser 640, which is positioned over the light guide plate 600, serves to diffuse the light emitted from the light guide plate 600 to make luminance distribution more uniform.

As illustrated in FIGS. 3 and 4A, the diffuser 640 is positioned to overlap the light diffusion member 300 and the light guide plate 600 according to the exemplary embodiment of the present invention. By the overlapping, it is possible to prevent a visible boundary between the light incident to the diffuser 640 through the light diffusion member 300 and the light incident to the diffuser 640 through the light guide plate 600 from occurring.

The exemplary embodiment of the present invention describes only the diffuser 640 by way of example, but the present invention is not limited thereto, and may include any sheet which may be formed in plural and may further include additional sheets such as an optical sheet or a protective sheet having other characteristics.

Hereinafter, the shape of the light diffusion member 300 according to further exemplary embodiments of the present invention will be described with reference to FIGS. 5 to 14. FIGS. 5 to 14 are partial cross-sectional views of a display device according to other exemplary embodiments of the present invention. Hereinafter, the description of previously-described components will be omitted, and only the shape of the light diffusion member 300 will be described.

The light diffusion member 300 may have various shapes as illustrated in FIGS. 5 to 11, but even in this case, the above-mentioned angle condition (wherein a sum of the acute angle θ1 and the acute angle θ2 ranges from about 50° to 100°) needs to be satisfied. The reason is that total reflection is generated inside the light diffusion member 300 only when this condition is satisfied.

Figure 5:
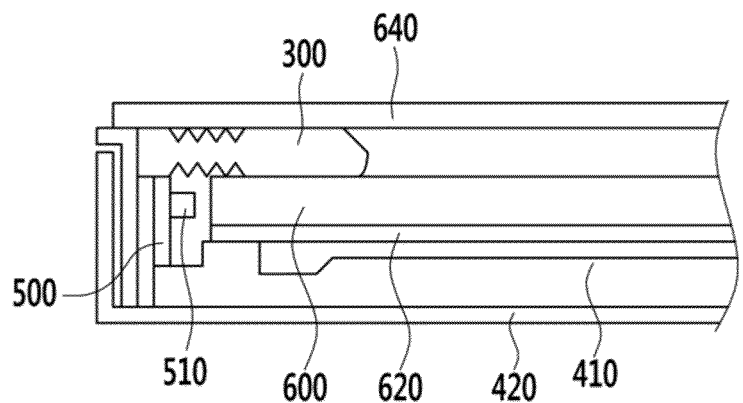
FIGS. 5 to 14 are cross-sectional views of a light diffusion member according to another exemplary embodiment of the present invention

First, describing the light diffusion member 300 illustrated in FIG. 5, the light diffusion member 300 includes the first pattern 310 and the second pattern 320, and in particular, each of the first pattern 310 and the second pattern 320 includes a plurality of grooves. In this case, the sizes of the plurality of grooves or the number or shapes thereof are not limited. While the present specification illustrates a configuration in which the first pattern 310 and the second pattern 320 are symmetrical to each other, embodiments are not limited thereto, and the first pattern 310 and the second pattern 320 may have different sizes and number, of shapes, any of which may be symmetric or not.

The light moving through the space 50 moves into the light diffusion member 300 through the first pattern 310, and the predetermined amount of light moving thereinto is emitted toward the display panel or the diffuser 640 in uniform manner as the light moves along the shape of the light diffusion member 300. That is, light is emitted substantially uniformly across the entire outer surface of the member 300.

In particular, describing one end of the light diffusion member 300 overlapping the light guide plate 600, the right upper end has a tapered shape and the right lower end has a curved shape, and therefore light is partially emitted from both of the right upper end and the right lower end, thereby providing uniform light emission from member 300.

Figure 6:
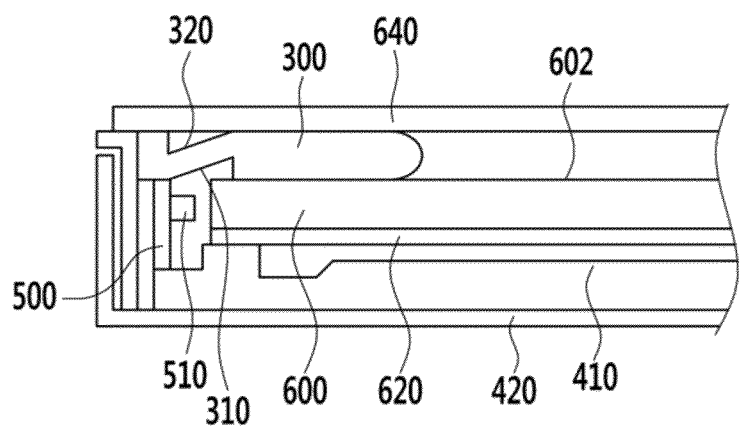

Next, referring to FIG. 6, the light diffusion member 300 includes both of the first pattern 310 and the second pattern 320, and in particular, the first pattern 310 and the second pattern 320 include grooves which are inclined in different directions.

In detail, either one of the first pattern 310 and the second pattern 320 may include grooves which are inclined in one direction with respect to the light emitting surface 602 of the light guide plate, and the remaining one of the first pattern 310 and the second pattern 320 may further include grooves inclined in the other direction with respect to the light emitting surface 602. FIG. 6 illustrates that the first pattern 310 includes a groove inclined toward the light guide plate 600 and the second pattern 320 includes a groove inclined toward the light source 510, although any configuration of inclinations is contemplated.

Further, the first pattern 310 and the second pattern 320 each include only one groove, but the first pattern 310 and the second pattern 320 may also include a plurality of grooves which are inclined in the predetermined directions.

Figure 7:
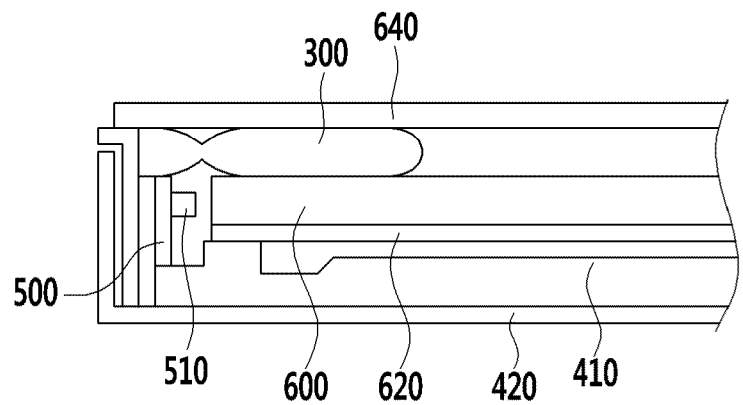
Figure 8:
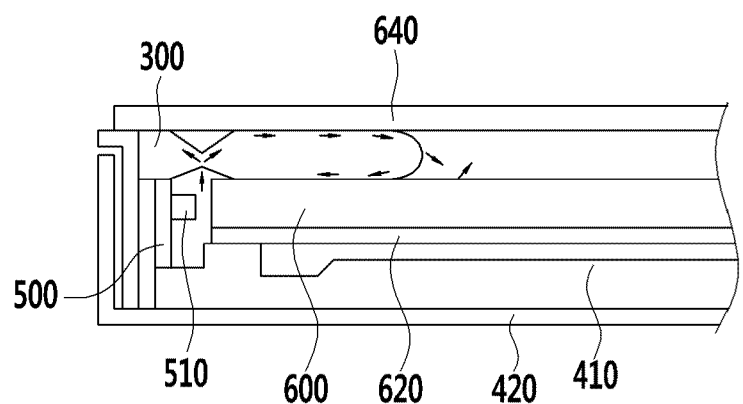

Describing the light diffusion member 300 with reference to FIGS. 7 and 8, the end of the light diffusion member 300 overlapping the light guide plate 600 has a curved shape. To supplement the shape illustrated in FIG. 9 to be described below, this is to prevent the occurrence of dark and bright spots caused by the light diffusion member 300.

Further, the exemplary embodiments of FIGS. 7 and 8 have grooves with curved surfaces or planar (flat) surfaces. However, the exemplary embodiments of the present invention are not limited thereto, and the surface of the groove may have various patterns or roughness. Any surface profiles are contemplated.

Light reflected back into the diffusion member 300 propagates, or is circulated along, the curved outer surface of the member 300, and some is emitted from the lower portion of the curved end of the light diffusion member 300. The emitted light again collides with the light guide plate 600 and eventually moves toward the diffuser 640 and the display panel, thereby providing more uniform light Meanwhile, in the light diffusion member 300 illustrated in FIG. 9, the end of the light diffusion member 300 overlapping the light guide plate 600 is not tapered but has a flat surface oriented perpendicular to the light guide plate 600. That is, the end of the light diffusion member 300 has a surface that is perpendicular to the light emitting surface 602 of the light guide plate 600.

Part of the light circulating in the light diffusion member 300 is emitted from the upper portion of the perpendicular surface. This emitted light again collides with the light guide plate 600 and thus may move toward the diffuser 640 and on to the display panel.

Figure 10:
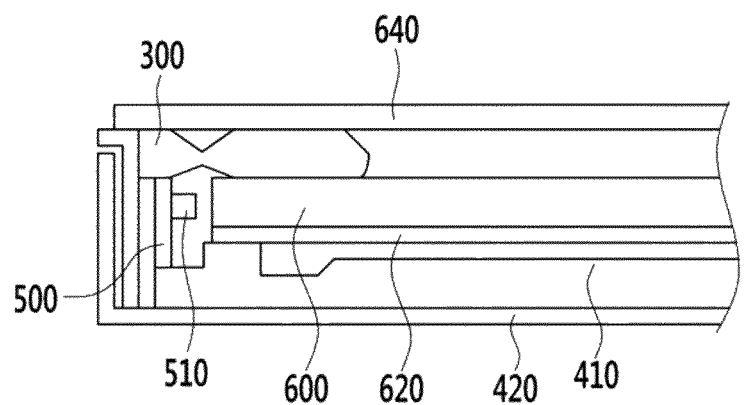

FIG. 10 is substantially similar to the light diffusion member 300 according to the exemplary embodiment of the present invention illustrated in FIGS. 3 and 4A, but has a difference in that the first pattern 310 and the second pattern 320 are not symmetric to each other. The length of the first pattern 310 is larger than that of the second pattern 320. That is, the size of the first pattern 310 is different from that of the second pattern 320.

FIG. 10 illustrates an exemplary embodiment of the asymmetrical structure in which the sizes of the patterns are different, but exemplary embodiments of the present invention may have various combinations of structures of angle, roughness, and number of patterns, without being limited in any manner.

Figure 11:
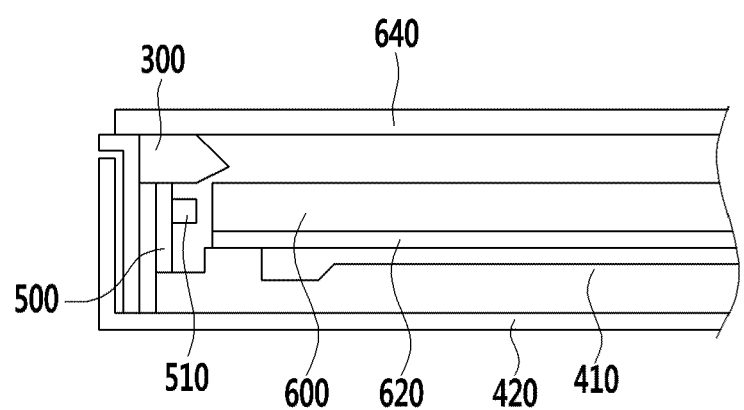

FIG. 11 illustrates the case in which the width of the light diffusion member 300 according to an exemplary embodiment of the present invention is substantially half of that in the exemplary embodiment of the present invention illustrated in FIG. 3. Therefore, the exemplary embodiment of the present invention is differentiated from previous exemplary embodiments in which the first pattern and the second pattern form a predetermined inclined surface and include grooves. Here, the inclined surfaces taper to a tip, rather than forming grooves.

The inclined surfaces of the light diffusion member 300 cover the space 50, effectively blocking light from leaking out, so that it instead circulates within the diffusion member 300.

The light circulated inside the light diffusion member 300 according to the exemplary embodiment of the present invention is partially emitted at the inclined surface, and some of the circulated light is also emitted through the other end of the light diffusion member 300 overlapping the light source 510. Therefore, the light leakage phenomenon may be prevented and light of more uniform brightness may be provided, even when the light diffusion member 300 has the shape shown in the previously described figures.

Light diffusion members 300 having various shapes are described above, and features of the exemplary embodiments of the present invention may be combined with each other. Therefore, the invention is not limited to the illustrated exemplary embodiments of the present invention. That is, to guide the light incident into the light diffusion member 300 in a predetermined direction, a combination of any one or more shapes as described above may be possible.

Hereinafter, another exemplary embodiment of the present invention including other components will be described with reference to FIGS. 12 to 14. The description of the same components as those of the above-mentioned exemplary embodiments will be omitted.

Figure 12:
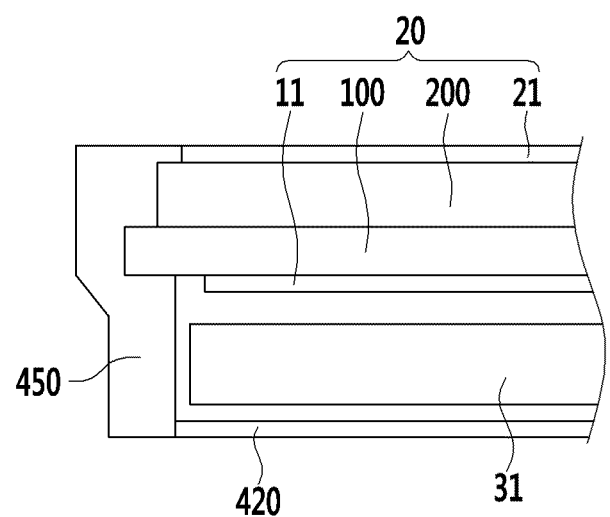

Referring to FIG. 12, the display device according to the exemplary embodiment of the present invention may not include a separate top chassis. The exemplary embodiment of the present invention illustrated in FIG. 2 illustrates the top chassis 430 having a predetermined width with respect to the plane of the display panel.

In contrast, FIG. 12 illustrates an exemplary embodiment in which the light unit 31 is coupled to the display panel 20 by the mold frame 450 which is connected to the bottom chassis 420. That is, the mold frame 450 forms the outermost structure, allowing the top chassis to be omitted. When the top chassis is omitted, the weight of the display device may be reduced and the manufacturing costs thereof may be reduced.

Further, according to the exemplary embodiment of the present invention illustrated in FIG. 12, any member which may couple the mold frame 450 to the display panel 20 may be used. For example, the mold frame 450 and the display panel 20 may be coupled by an adhesive member such as a tape. Further, the mold frame 450 and the display panel 20 may be coupled to each other only by a structure without a separate adhesive member.

Although not shown in FIG. 12, a light diffusion member 300 is present, positioned between the light unit 31 and display panel 20 as in any one of the previous embodiments.

When the display device includes the light diffusion member 300 according to the exemplary embodiment of the present invention, certain problems occurring when the top chassis is omitted may be solved. That is, even though the light source 510 is exposed in the display area DA, the light leakage phenomenon or the problem of dark/bright spots does not arise, since the light diffusion member 300 is present.

Figure 13:
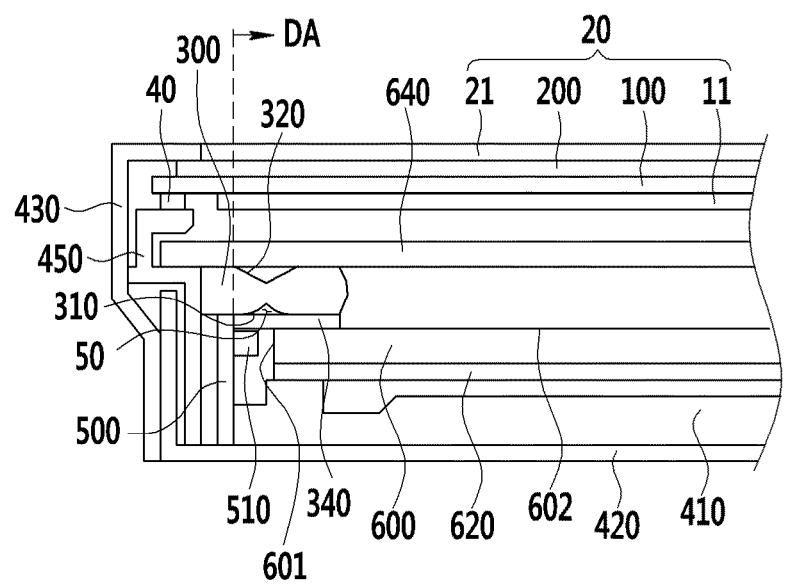

Next, referring to FIG. 13, the display device according to the exemplary embodiment of the present invention may further include a sheet 340 which is positioned beneath the light diffusion member 300 and which includes a predetermined reflective pattern.

In more detail, the sheet 340 may include a base substrate which is made of a light transmitting material, as well as a reflective pattern which reflects light and comprises a pattern of dot shapes. Light incident to the reflective pattern of the sheet 340 is reflected, and light incident to only the base substrate is transmitted so as to be incident to the light diffusion member 300.

Alternatively, the sheet 340 may include a base substrate made of a light reflecting material, and a transmitting hole which is positioned on the base substrate and which transmits light therethrough. The light incident to the transmitting hole passes through the sheet 340 and then is incident to the light diffusion member 300, whereas the light incident only to the base substrate is reflected back.

That is, the sheet 340 including the predetermined reflective pattern or the transmitting hole partially transmits and partially reflects light incident to the space in which the light diffusion member 300 and the sheet 340 are positioned, thereby controlling the quantity of light incident to the light diffusion member 300. By the control of this quantity of light, the exemplary embodiment of the present invention may provide a display panel which transmits a more uniform quantity of light.

The reflective sheet 340 reflects part of the light from the space 50, thereby controlling the quantity of light incident to the light diffusion member 300. According to the exemplary embodiment of the present invention including the reflective sheet 340, the first pattern 310 may be omitted.

The light incident to the light diffusion member 300 through the reflective sheet 340 is totally reflected by the second pattern 320, and a predetermined amount of light may be emitted while circulating through the light diffusion member 300.

The reflective sheet 340 may be made of any material to control the quantity of light passing therethrough, and for example, may be a single sheet or a double sheet including silver (Ag), aluminum (Al), or the like. Further, the reflective sheet 340 is not limited to sheets including the reflective pattern, for example a sheet applied with reflective ink may also perform the same function.

Figure 14:
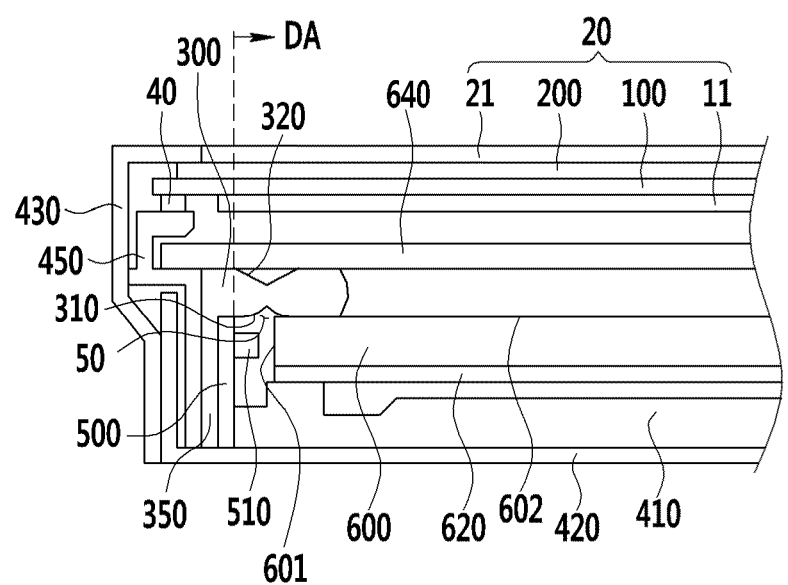

Next, referring to FIG. 14, the light diffusion member 300 may further include a fixing part 350 which more securely fastens the light diffusion member 300 in place.

The fixing part 350 may extend from, for example, the leftmost end of the light diffusion member 300 in FIG. 14. In particular, the fixing part 350 may extend to be positioned and fixed in the space between the mold frame 450, the bottom chassis 420, and the circuit board 500. However, the fixing part 350 is not limited to the above shape, and therefore any shape which is inserted into the predetermined space to fix the light diffusion member 300 may be possible.

Further, the fixing part 350 may be formed to be coupled to the chassis 420 or the mold frame 450 by, for example, double insert injection. By processes such as double insert injection, the problem of fixing the light diffusion member using a separate process may be removed.

The present specification describes a light diffusion member 300 which is fixed at a predetermined position by a fixing part, but embodiments of the invention are not limited thereto. For example, the light diffusion member 300 may be affixed using a separate adhesive member or the like.

Hereinafter, simulation results of the display device according to an exemplary embodiment of the present invention will be described with reference to FIGS. 15 and 16. FIGS. 15A and 15B are images illustrating simulation results of the display device according to an exemplary embodiment of the present invention, and FIGS. 16A to 16D are images illustrating simulation results of the display devices including various light diffusion members according to other exemplary embodiments of the present invention.

Figure 15A:
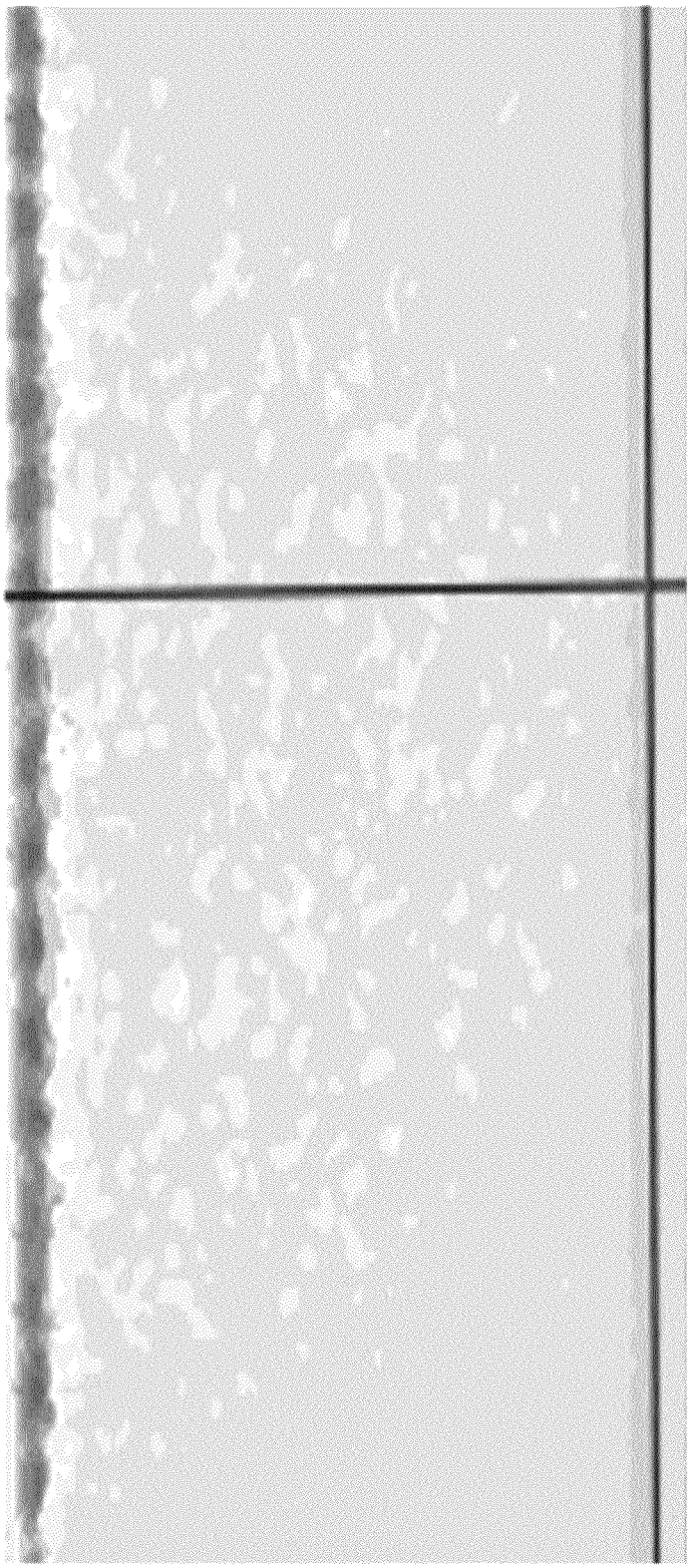
FIGS. 15A and 15B are images illustrating simulation results of the display device according to an exemplary embodiment of the present invention
Figure 15B:

FIG. 15A illustrates a case in which a light diffusion member according to the exemplary embodiment of the present invention is not used, and FIG. 15B illustrates a case in which a light diffusion member according to the exemplary embodiment of the present invention is used. FIGS. 15A-15B are plan views of a light guide plate, with the portion of the light guide plate nearest the light sources being located at the upper portion of FIGS. 15A-15B.

Describing the simulation results, it may be appreciated from FIG. 15A, which is a comparative example, that a considerable amount of light leakage may occur in the space between the light source and the light guide plate as illustrated at the upper portion of the image. In the image, light leakage is represented by spots, and in another display panel area, the uniform emission of light represented by no spots is made by the uniform light diffusion of the light guide plate 600.

The difference in the quantity of light may be visually seen by the user, and occurs since, as the width of the bezel is thin, the space is exposed. On the other hand, according to the exemplary embodiment of the present invention, FIG. 15B illustrates the case in which the light diffusion member is positioned in the space between the light guide plate and the light source, and therefore it may be appreciated that the light leakage phenomenon represented by a red color illustrated in FIG. 15A does not appear at all. That is, the light leakage phenomenon is substantially removed.

Further, when light leakage is simply blocked, light is not emitted to the corresponding area, such that the corresponding area may be visually seen as a dark area. However, as light is evenly emitted from the entire body of the light diffusion member, as compared with the area corresponding to the light guide plate, substantially the same light is emitted and therefore the area is not visually seen as a dark area.

That is, according to the light diffusion member of exemplary embodiments of the present invention, the light leakage phenomenon of the display panel and the presence of dark and bright areas are remarkably reduced, and therefore the overall brightness of the light guide plate may be more uniform.

Figure 9:
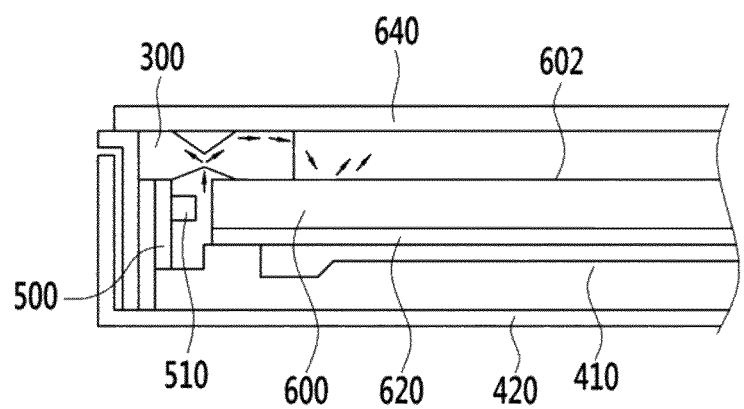
Figure 16A:
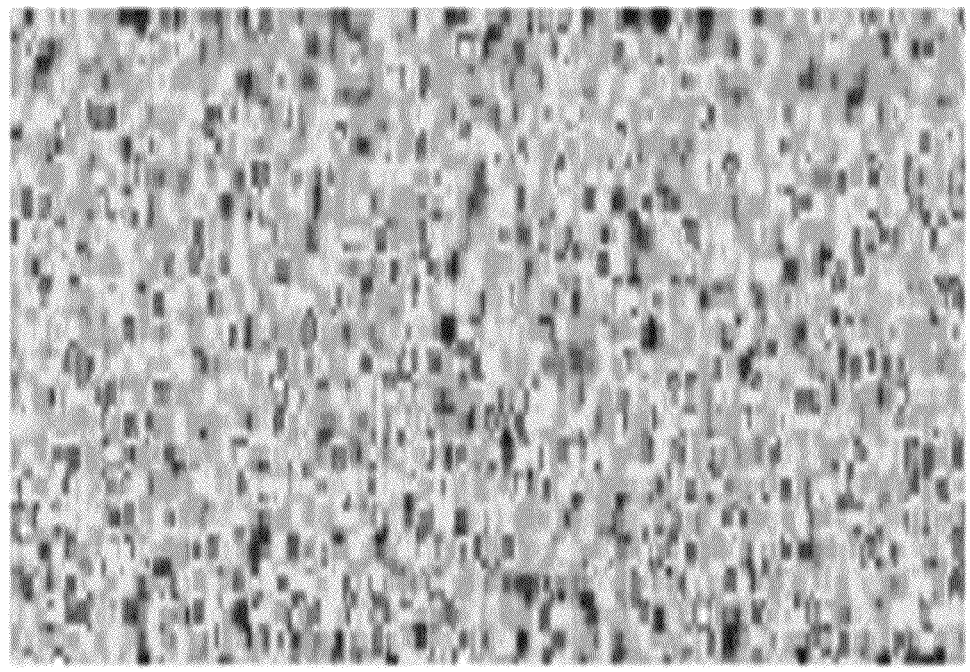
FIGS. 16A to 16D are images illustrating simulation results of the display device according to an exemplary embodiment of the present invention.
Figure 16B:
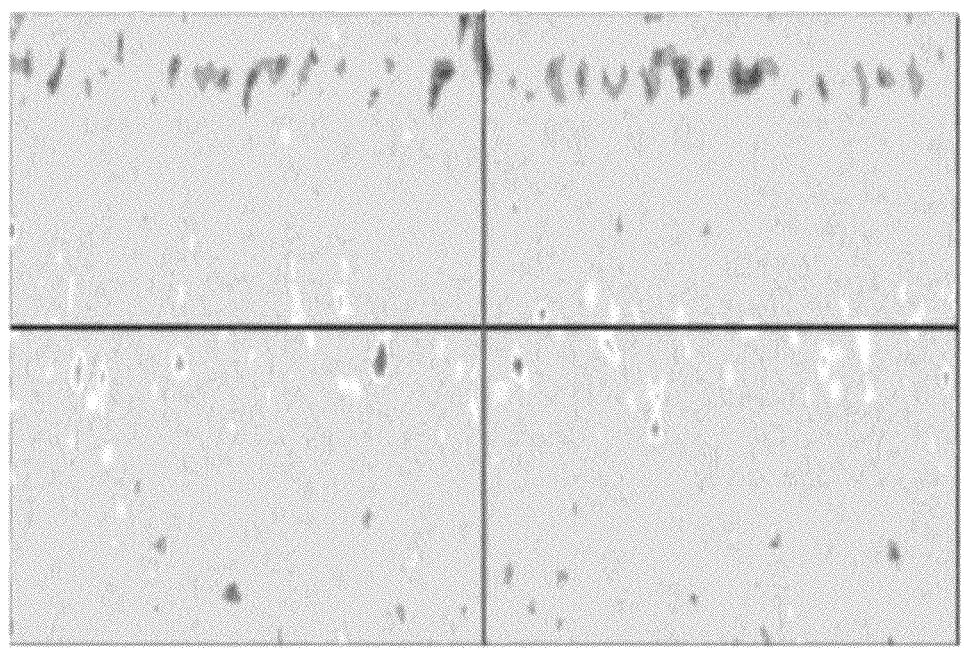
Figure 16C:
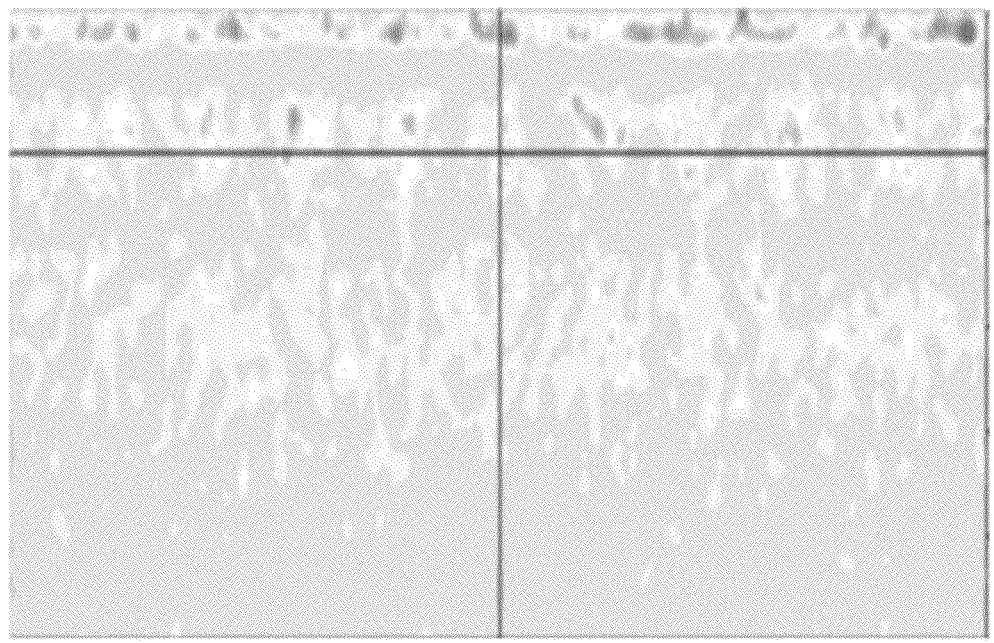
Figure 16D:
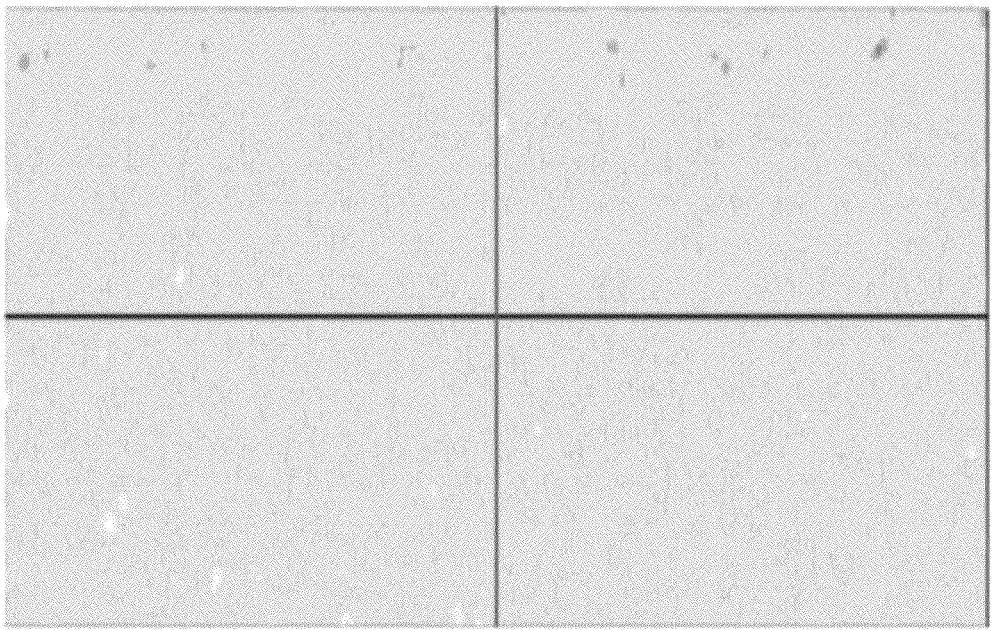

FIG. 16A illustrates a case using a light diffusion member having the shape as illustrated in FIG. 11, FIG. 16B illustrates a case using a light diffusion member having the shape as illustrated in FIG. 9, FIG. 16C illustrates a case using a light diffusion member having the shape as illustrated in FIG. 8, and FIG. 16D illustrates a case using a light diffusion member having the shape as illustrated in FIGS. 3 and 4A. The moving paths of light depending on the simulation results are shown by arrows illustrated in FIGS. 4A, 8, 9, and 11.

First, FIGS. 16A to 16D have slight differences from each other, but it may be seen that the light leakage phenomenon is significantly reduced compared to FIG. 15A in which the light diffusion member is not present.

Meanwhile, referring to FIG. 16A, it may be confirmed that the image appears slightly stained, and forms substantially the same pattern across the entire display panel. That is, it may be confirmed that light generally having constant brightness is seen by the user's eye without visually seeing separate dark or bright patches.

Next, referring to FIG. 16B, it may be confirmed that the light leakage phenomenon does not occur in the space between the light source and the light guide plate.

This will be described in detail with reference to FIG. 9 which illustrates the path of light. Describing the one end of the light diffusion member 300 overlapping the light guide plate 600, the one end of the light diffusion member 300 includes a surface perpendicular to the light emitting surface 602 of the light guide plate 600.

The light circulating within the light diffusion member is emitted partly from the lower portion of the perpendicular surface. The emitted light again collides with the light guide plate 600 and thus moves toward the diffuser 640 and the display panel. However, some dark spots may still arise, as light is not completely uniformly emitted by either the light guide plate 600 or light diffusion member 300.

Some of these dark spots may be seen in FIG. 16B. However, the fine difference may not always be visible, as compared with the light leakage.

Next, referring to FIG. 16C, it may also be confirmed that the light leakage phenomenon does not occur in the space between the light source and the light guide plate. This will be described in detail with reference to FIG. 8, which illustrates the path of light. Describing the one end of the light diffusion member 300 overlapping the light guide plate 600, the one end of the light diffusion member 300 includes a curved surface positioned over the light guide plate 600

The light circulating through the light diffusion member is emitted from the lower portion of the curved surface. The emitted light again collides with the light guide plate 600, and thus moves toward the diffuser 640 and the display panel. However, some dark spots may still be present.

The space may be visually seen as a dark area, and both sides thereof may be visually seen as the bright part. That is, as illustrated in FIG. 16C, a slightly differentiated area (a darker area and a separate lighter area) may be formed based on the space between the light source and the light guide plate. However, compared with the light and dark areas present when the light leakage phenomenon occurs, this is a minute difference which may not be generally visible.

Next, referring to FIG. 16D, it may also be confirmed that the light leakage phenomenon does not occur.

Further, as described with reference to FIGS. 4A to 4D, the light propagating within the light diffusion member 300 is partially emitted from the tapered area which is positioned at the right upper end, and the light moving along the curved area which is positioned at the right lower end is again partially emitted. That is, the quantities of light emitted from the plurality of areas are substantially the same, so that no dark or bright spots are generated.

Therefore, as illustrated in FIG. 16D, the light emitted inside the display area is emitted at substantially the same quantity, and may be visually seen to have uniform brightness without creating dark or bright areas.

In particular, it can be appreciated from FIGS. 16A to 16D that use of the light diffusion member of FIG. 4 results in a display device with the most uniform light distribution.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of different embodiments of the invention may be mixed and matched in any manner, to produce further embodiments contemplated by the invention.

<Description of Symbols>

| | |
|---|---|
| 10: Display device | 11, 21: Polarizer |
| 20: Display panel | 31: Light unit |
| 40: Adhesive part | 100: First substrate |
| 200: Second substrate | 300: Light diffusion member |
| 310: Groove | 410: Auxiliary chassis |
| 420: Bottom chassis | 430: Top chassis |
| 450: Mold frame | 500: Circuit board |
| 510: Light source | 600: Light guide plate |
| 620: Reflector | 640: Diffuser |

What is claimed is:

1. A display device, comprising
a display panel including a display area configured to display an image, and
a light unit configured to provide light to the display panel, wherein the light unit includes:
  a light guide plate including a light receiving surface and a light emitting surface,
  a light source spaced apart from the light receiving surface while facing the light receiving surface and overlapping the display area, and
  a light diffusion member positioned to extend between the light receiving surface and the light source, and
wherein the light diffusion member includes at least one of
  a first pattern formed on a first surface of the light diffusion member facing the light emitting surface of the light guide plate, and a second pattern formed on a second surface of the light diffusion member.

2. The display device of claim 1, wherein
the first pattern and the second pattern include at least one groove.

3. The display device of claim 2, wherein
either one of the first pattern and the second pattern includes a first groove having a surface inclined with respect to the light emitting surface of the light guide plate so as to extend in one direction.

4. The display device of claim 3, wherein
the remaining one of the first pattern and the second pattern further includes a second groove having a surface inclined with respect to the light emitting surface of the light guide plate so as to extend in another direction different from the one direction.

5. The display device of claim 1, wherein
the first pattern and the second pattern are asymmetric with respect to an axis positioned between the first and second patterns.

6. The display device of claim 1, wherein
the first pattern and the second pattern are symmetric with respect to an axis positioned between the first and second patterns.

7. The display device of claim 1, wherein
a first end of the first pattern overlaps the light emitting surface of the light guide plate and a second end of the first pattern overlaps the light source.

8. The display device of claim 2, wherein
the at least one groove has a curved surface.

9. The display device of claim 1, wherein
a first end of the light diffusion member overlapping the light guide plate has a curved surface.

10. The display device of claim 1, wherein
an end of the light diffusion member overlapping the light guide plate is a tapered end.

11. The display device of claim 9, wherein
a second end of the light diffusion member overlaps the display area.

12. The display device of claim 2, wherein
a sum of an angle between the light emitting surface of the light guide plate and a surface of the first pattern and an angle between the light emitting surface of the light guide plate and the second pattern is between about 50° and about 100°.

13. The display device of claim 12, wherein
the light diffusion member is configured and oriented so that at least some light enters the light diffusion member from the light source at a first angle between rays of the at least some light and the light emitting surface, and the at least some light subsequently exits the light diffusion member at a second angle between rays of the at least some light and the light emitting surface, the first angle being greater than the second angle.

14. The display device of claim 1, wherein
the light unit further includes a diffuser positioned on the light diffusion member, and
the diffuser overlaps the light diffusion member and the light guide plate.

15. The display device of claim 14, wherein
surfaces of the at least one of the first and second patterns are oriented so that light entering the light diffusion member from the light source is reflected by the surfaces back into the light diffusion member so as to repeatedly propagate through the light diffusion member.

16. The display device of claim 15, wherein
the surfaces of the at least one of the first and second patterns are oriented so that light propagating through the light diffusion member is emitted in substantially uniform manner across an outer surface of the light diffusion member.

17. The display device of claim 1, further comprising
a reflective sheet positioned on one surface of the light diffusion member.

18. The display device of claim 1, further comprising
a chassis in which the light unit is mounted,
wherein the light diffusion member further includes
a fixing part which extends into a space between the light diffusion member and the chassis.

19. The display device of claim 18, wherein
the fixing part is formed by double insert injection.

* * * * *